(12) United States Patent
Thorens

(10) Patent No.: US 10,398,175 B2
(45) Date of Patent: Sep. 3, 2019

(54) INHALING DEVICE WITH USER RECOGNITION BASED ON INHALATION BEHAVIOUR

(71) Applicant: Philip Morris Products S.A., Neuchatel (CH)

(72) Inventor: Michel Thorens, Moudon (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 15/531,838

(22) PCT Filed: Dec. 1, 2015

(86) PCT No.: PCT/EP2015/078212
§ 371 (c)(1),
(2) Date: May 31, 2017

(87) PCT Pub. No.: WO2016/091658
PCT Pub. Date: Jun. 16, 2016

(65) Prior Publication Data
US 2017/0318861 A1 Nov. 9, 2017

(30) Foreign Application Priority Data
Dec. 11, 2014 (EP) .................................... 14197310

(51) Int. Cl.
*A24F 11/00* (2006.01)
*A24F 1/32* (2006.01)
(Continued)

(52) U.S. Cl.
CPC .......... *A24F 47/008* (2013.01); *G06F 16/288* (2019.01)

(58) Field of Classification Search
CPC ....... A24F 47/00; A24F 47/004; A24F 47/008
(Continued)

(56) References Cited

U.S. PATENT DOCUMENTS 5,934,289 A 8/1999 Watkins et al.
8,869,793 B1 * 10/2014 Spandorfer ............ A61B 5/082
128/203.14
(Continued)

FOREIGN PATENT DOCUMENTS

CN 103237468 A 8/2013
CN 203455642 U 2/2014
(Continued)

OTHER PUBLICATIONS

Extended European Search Report dated Jun. 9, 2015 in Patent Application No. 14197310.7.
(Continued)

*Primary Examiner* — Abdullah A Riyami
*Assistant Examiner* — Thang H Nguyen
(74) *Attorney, Agent, or Firm* — Oblon, McClelland, Maier & Neustadt, L.L.P.

(57) ABSTRACT

A method of controlling operation of an inhaling device is provided, the inhaling device including a gas flow path through which gas can be drawn by the action of a user puff, a gas flow sensor within the gas flow path, and a memory, the method including recording gas flow measurements from the gas flow sensor; comparing the gas flow measurements with the user puff signature stored in the memory to provide a correlation score; and enabling or disabling further operation of the device based on a value of the correlation score. The method allows an inhaling device, such as an electrically operated smoking device or a medical inhaler, to authenticate a user of the device based on a detected puffing behavior.

20 Claims, 6 Drawing Sheets

(51) Int. Cl.
*A24F 1/00* (2006.01)
*A24F 47/00* (2006.01)
*G06F 16/28* (2019.01)

(58) Field of Classification Search
USPC .................................................. 131/328, 329
See application file for complete search history.

(56) References Cited

U.S. PATENT DOCUMENTS

| | | | | |
|---|---|---|---|---|
| 2011/0036346 | A1* | 2/2011 | Cohen | A61M 11/042 128/200.14 |
| 2013/0284192 | A1* | 10/2013 | Peleg | A24F 47/002 131/329 |
| 2014/0096782 | A1 | 4/2014 | Ampolini et al. | |
| 2014/0278250 | A1* | 9/2014 | Smith | A24F 47/002 702/187 |
| 2014/0345633 | A1* | 11/2014 | Talon | A24F 47/008 131/329 |
| 2014/0346689 | A1 | 11/2014 | Dubief | |
| 2015/0053217 | A1* | 2/2015 | Steingraber | A24F 47/008 131/329 |
| 2015/0142387 | A1* | 5/2015 | Alarcon | A61M 11/042 702/187 |
| 2015/0230521 | A1* | 8/2015 | Talon | A24F 47/008 131/328 |
| 2015/0245660 | A1 | 9/2015 | Lord | |
| 2016/0192705 | A1* | 7/2016 | Borkovec | A24F 47/008 131/328 |

FOREIGN PATENT DOCUMENTS

| | | |
|---|---|---|
| CN | 203536538 U | 4/2014 |
| CN | 103945716 A | 7/2014 |
| CN | 203709255 U | 7/2014 |
| CN | 104055227 A | 9/2014 |
| CN | 104146354 A | 11/2014 |
| CN | 203943074 U | 11/2014 |
| EP | 2 143 346 A1 | 1/2010 |
| GB | 2 507 104 A | 4/2014 |
| WO | WO 98/17130 A1 | 4/1998 |
| WO | WO 2010/003480 A1 | 1/2010 |
| WO | WO 2013/083634 A1 | 6/2013 |
| WO | WO 2014/150704 A2 | 9/2014 |

OTHER PUBLICATIONS

International Preliminary Report on Patentability and Written Opinion dated Jun. 22, 2017 in PCT/EP2015/078212.
Lion Shahab, et al. "The reliability and validity of self-reported puffing behavior: Evidence from a cross-national study," Nicotine & Tobacco Research, vol. 10, No. 5, 2008, pp. 867-874.
International Search Report and Written Opinion dated Feb. 2, 2016 in PCT/EP2015/078212, filed Dec. 1, 2015.
Chinese Office Action with English translation dated May 28, 2019 in corresponding Chinese Patent Application No. 201580066306.X, (16 pages).

* cited by examiner

INHALING DEVICE WITH USER RECOGNITION BASED ON INHALATION BEHAVIOUR

TECHNICAL FIELD

The invention relates to inhaling devices configured to allow a user to inhale an aerosol or vapour containing a desired medicament or ingredient. Examples of inhaling devices of this kind include electrically operated cigarettes, heated tobacco systems and medical inhalators. In particular, the invention relates to devices and methods that can recognise or authenticate a user based on the puffing behaviour of the user.

DESCRIPTION OF THE RELATED ART

One example of an inhaling device is an electronic cigarette. Although electronic cigarettes are believed to be less harmful than conventional cigarettes and may be used as a smoking cessation aid, they are not intended for use by unauthorised individuals, particularly those below the legal age for electronic cigarettes. In currently available electronic cigarettes there is no mechanism for preventing unauthorised use.

There are a number of user identification systems that are used in other electronic devices. For example, mobile telephones typically require a user to enter a password before they will fully operate. More sophisticated systems include fingerprint recognition, face recognition, voice recognition and retinal scanning. However, these systems are typically too bulky to integrate into small devices such as electronic cigarettes. And even the smaller systems, such as fingerprint and sweeping gesture recognition, require complex and expensive electronics and software to be integrated into the device. WO2014/150704 describes some systems of this type used to prevent unauthorised use of an electronic cigarette.

It would be desirable to provide a simpler, less bulky and less expensive means of preventing unauthorised use of an inhaling device. It would also be desirable to provide a means of automatically recognising a user of an inhaling device in order to provide for personalised operation of the device.

SUMMARY

In a first aspect there is provided a method of controlling operation of an inhaling device, the inhaling device comprising a gas flow path through which gas can be drawn by the action of a user puff, a gas flow sensor within the gas flow path and a memory, the method comprising:

recording gas flow measurements from the gas flow sensor;

comparing the gas flow measurements with a user puff signature stored in memory to provide a correlation score; and enabling or disabling further operation of the device based on a value of the correlation score.

BRIEF DESCRIPTION OF THE DRAWINGS

Features described in relation to one aspect of the invention may be applicable to another aspect of the invention. Embodiments of the invention will now be further described, by way of example only, with reference to the accompanying drawings in which.

DETAILED DESCRIPTION

Figure 1:
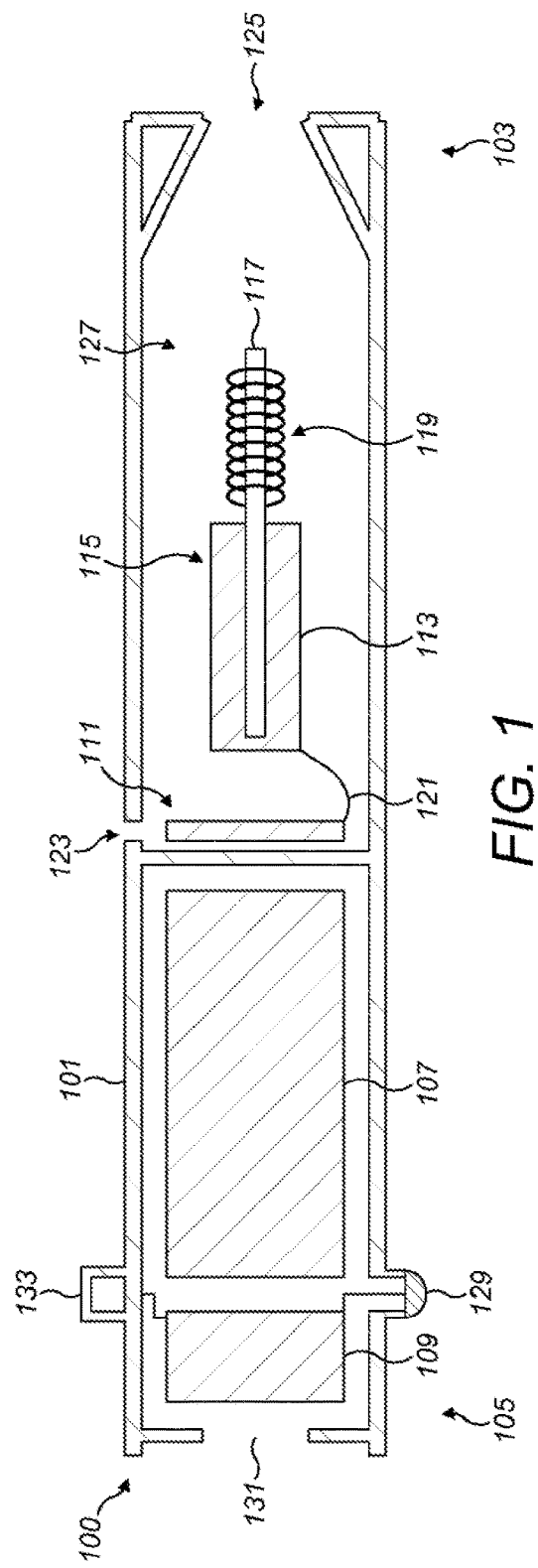
FIG. 1 illustrates a first example of an electrically operated smoking system in accordance with an embodiment of the invention.

This method allows an inhaling device, such as an electrically operated smoking device or a medical inhaler to authenticate a user of the device based on a detected puffing behaviour. Only if the user is determined to be an authentic user is the device enabled for further operation, for example to deliver aerosol to the user. This method of authentication and preventing unauthorised use of the device is simple and compact, and given that many inhaling devices incorporate a flow sensor and a controller for other purposes, is a very inexpensive solution in many cases.

As used herein, an inhaling device comprises any device which is configured to deliver a substance for inhalation by the user. An inhaling device may, for example, be a medical inhaler or nebuliser, a vaporiser, an electronic cigarette or a heated tobacco device. As used herein, inhaling means the action of a user drawing an aerosol or gases into their body through their mouth or nose. Inhaling includes drawing into the lungs before exhalation, and also drawing only into the mouth or nasal cavity before exhalation.

As used herein gas flow measurement may refer to measurement of gas flow rate, which may be mass flow rate or volumetric flow rate, or may refer to measurement on one or more other parameters related to gas flow rate, such as pressure changes, changes in electrical resistance or electrical capacitance.

The method may further comprise recording a user puff signature based on signals from the gas flow sensor during a set-up procedure; and storing the user puff signature in the memory. The step of recording a user puff signature may comprise recording a gas flow rate past the gas flow sensor for a first predetermined time period. And the step of recording a user puff signature may comprise providing an indication to the user of the start of the first predetermined time period. So, in a set-up operation, a user may be required to provide a puff signature by providing a characteristic puffing behaviour within a set time period after an indicator, such as a light or speaker, is activated on the device. The user may choose whatever puff signature they like. For example, the user may choose a series or short sharp puffs or may choose a single long puff having a variable gas flow rate. This puffing behaviour is recorded for the set time period, for example two seconds, and stored in memory as the user puff signature.

The step of recording gas flow measurements may comprise recording a gas flow rate past the gas flow sensor for a second predetermined time period. The second predetermined time period may advantageously be of the same duration as the first predetermined time period. The step of recording gas flow measurements comprises providing an indication to user of start of the second predetermined time period or that the device is ready to start recording for the second predetermined time period. Again, a light or audible indication may be provided to indicate the start of the authentication procedure. The user then replicates his or her puff signature. The user's puff signature is recorded as gas flow measurements during the second predetermined time period and is then compared with the stored puff signature to provide a correlation score.

The correlation score may be a single value derived from a correlation or pattern matching algorithm.

The step of enabling or disabling further operation of the device may comprise comparing the correlation score with a threshold score and enabling further operation of the device if the correlation score exceeds the threshold score. If the correlation score does not exceed the threshold score the device may be disabled. The step of disabling the system may comprise disabling the system for a predetermined disable time period before the user can attempt the authentication procedure again. The disable time period may increase with each subsequent disabling of the device until a user is successfully authenticated and the device is enabled. For example, a first disabling of the device may comprise disabling the device for only a few seconds. If the user subsequently fails to provide a matching puff signature again, a second disabling of the device may comprise disabling the device for 2 minutes. If a further unsuccessful attempt is made to provide a matching puff signature the device may be disabled for an hour.

The method may also comprise permanently disabling the device until a reset procedure is carried out. A reset procedure may comprise connecting the device to a PC or other secondary device, and providing a different form of authentication through the secondary device, such as a password. Once a reset procedure is carried out, a user may need to record a new puff signature.

The method may further comprise a step of modifying the user puff signature based on the gas flow measurements if the correlation score exceeds the threshold score. In this way, each time that a user is successfully authenticated, their puff signature can be updated with or replaced by the most recent matching puff behaviour. This may be beneficial in tracking small changes in puff behaviour over time or providing an averaging for the signature that accounts for variations due to the time of day, the season or local environment.

It is also possible that the user puff signature is not puffing behaviour that is deliberately produced by a user as a signature. The user puff signature may be recorded natural puffing behaviour that is particular to the user.

The step of comparing the gas flow measurements with the user puff signature may comprise comparing any suitable parameters of the gas flow measurements. For example, one or more of the following parameters may be used: time to end of puff, time to peak flow rate, time to first maximum flow rate, time to first minimum flow rate, time between peak flow rates, rate of change of flow rate, number of peak flow rates, flow rate at peak flow rates, puff volume, peak flow ratios, rate of change of flow rate ratios, inter puff interval, and curve shape. For example, the user puff signature may comprise a maximum flow rate, a number of flow peaks and an initial rate of change of flow rate over the first 0.5 seconds. Each of these parameters may be extracted from the gas flow measurements. The comparison may be made for each of the parameters and a weighted sum of the comparison results used to provide a final correlation score.

The choice of parameters used will depend on the length and complexity of the puff signatures recorded and the sensitivity of the gas flow measurements obtained. The aim is to provide for reliable authentication of genuine users, with a balance between false rejection and false acceptance. The choice of parameters, correlation algorithm and threshold score can all be adjusted to provide the required performance based on trial and error.

The method may further comprise modifying the recorded user puff signature dependent on a time of day, or based on a type of consumable being used with the device, or both, prior to the step comparing the gas flow measurements with the user puff signature. If it is established that users typically take stronger puffs in the morning than the evening for example, the puff signature may be modified for the evening as compared to the morning.

If the device can be used with different consumables containing substances to be delivered to the user from the inhaling device, the different consumable may affect flow rate through the device. Accordingly, the puff signature may be modified based on the consumable being used. This is particularly useful if the user signature is not a deliberately produced signature but recorded natural puffing behaviour and it may reduce the false rejection rate.

The method may comprise storing a plurality of user puff signatures and the step of comparing the gas flow measurements with the user puff signature may comprise comparing the gas flow measurements with each puff signature to provide a plurality of correlation scores. This allows multiple users to be authorised for a single device. In the case of an electrically operated smoking device for example, there may be multiple authorised users within a household.

The method may further comprise modifying the operation of the device dependent on which of the plurality of correlation scores is the highest. This allows the operating parameters of the device to be set for the user that has been authenticated to use the device. Again, taking the example of a smoking device, one user may prefer a greater volume of delivered aerosol per puff than another authorised user. If the device generated aerosol by heating a substrate, the device may therefore be configured to provide more heat to the substrate for one user than for another. Also, a single user may record different puff signatures to provide for different device operation so that they can select a particular mode of operation by providing a particular puff signature. For example, one puff signature may be used when a very rapid delivery of aerosol is required and another puff signature may be used when a more gradual delivery of aerosol is required.

In a second aspect, there is provided an inhaling device comprising:

a controller configured to control the operation of the device;

a gas flow path through which gas can be drawn by the action of a user puff, a gas flow sensor within the gas flow path; and a memory, wherein the controller is configured to compare a user puff signature stored in the memory with gas flow measurements from the gas flow sensor to generate a correlation score, and is configured to enable or disable operation of the device based on a value of the correlation score.

The inhaling system may be an electrically operated smoking system.

The smoking system may be an electrically heated smoking system that heats an aerosol-forming substrate to generate an aerosol. The aerosol-forming substrate may be a liquid, held in a liquid storage portion or may be a solid substrate. In either case, the aerosol-forming substrate may be provided in a replaceable, consumable portion that engages the device in use. The smoking system may be a heated tobacco type system in which a cigarette is heated but not combusted to form an aerosol that can be directly inhaled by a user.

The device may comprise an air inlet, and a mouthpiece wherein the gas flow path extends between the air inlet and the mouthpiece and wherein gas can be drawn through the gas flow path by the action of a user puffing on the mouthpiece. Alternatively, the user may puff directly on an aerosol-forming substrate coupled to the device.

The controller may be configured to carry out some or all of the steps described with reference to the first aspect.

In particular the controller may be configured to record a user puff signature by recording a gas flow rate past the gas flow sensor for a first predetermined time period. And the device may comprise one or more indicators, such as an LED or speaker, and the controller may be configured provide an indication to the user of the start of the first predetermined time period. The controller may be configured to record gas flow measurements by recording a gas flow rate past the gas flow sensor for a second predetermined time period. The second predetermined time period may advantageously be of the same duration as the first predetermined time period. The controller may be configured to provide an indication to user of start of the second predetermined time period.

The controller may be configured to compare the correlation score with a threshold score and enable further operation of the device if the correlation score exceeds the threshold score. If the correlation score does not exceed the threshold score the controller may disable the device. The controller may disable the system for a predetermined disable time period before the user can attempt the authentication procedure again. The disable time period may increase with each subsequent disabling of the device until a user is successfully authenticated and the device is enabled.

The controller may also be configured to permanently disable the device until a reset procedure is carried out. A reset procedure may comprise connecting the device to a PC or other secondary device, and providing a different form of authentication through the secondary device, such as a password. Once a reset procedure is carried out, a user may need to record a new puff signature.

The controller may also be configured to modify the user puff signature based on the gas flow measurements if the correlation score exceeds the threshold score.

The controller may be configured to compare any suitable parameters of the gas flow measurements and user puff signature. For example, one or more of the following parameters may be used: time to end of puff, time to peak flow rate, time to first maximum flow rate, time to first minimum flow rate, time between peak flow rates, rate of change of flow rate, number of peak flow rates, flow rate at peak flow rates, puff volume, peak flow ratios, rate of change of flow rate ratios, inter puff interval, and curve shape. The comparison may be made for a plurality of parameters and a weighted sum of the comparison results used to provide a final correlation score.

The controller may also modify the recorded user puff signature dependent on a time of day, or based on a type of consumable being used with the device, or both, prior to comparing the gas flow measurements with the user puff signature.

The controller may store a plurality of user puff signatures and compare the gas flow measurements with each puff signature to provide a plurality of correlation scores. This allows multiple users to be authorised for a single device. In the case of an electrically operated smoking device for example, there may be multiple authorised users within a household. The controller may modify the operation of the device dependent on which of the plurality of correlation scores is the highest. This allows the operating parameters of the device to be set for the user that has been authenticated to use the device.

The gas flow sensor may be any suitable sensor, such as a microphone based sensor, which are commonly used in electronic cigarettes, a pressure sensor or a sensor based on electrical resistance, such as the sensor described in EP2143346, in which the cooling of a resistive element as a result of airflow affects its electrical resistance, providing an accurate indication of a puff.

The controller may comprise a microprocessor, which may be a programmable microprocessor. The controller may comprise further electronic components. The electric controller may be configured to regulate a supply of power to an aerosol-generating element, such as a heater or vibrating membrane. Power may be supplied to the aerosol-generating element continuously following activation of the system or may be supplied intermittently, such as on a puff-by-puff basis. The power may be supplied to the aerosol-generating element in the form of pulses of electrical current.

The device may comprise a non-volatile memory in which user puff signatures can be stored.

The device may comprise an aerosol-generating element configured to interact with an aerosol-forming substrate to produce an aerosol for inhalation. In one embodiment, the aerosol-generating element is a heater configured to heat an aerosol-generating substrate to provide an aerosol for inhalation by a user. The heater may comprise one or more heating elements and may be configured to heat a solid aerosol-forming substrate or a liquid aerosol-forming substrate. The heater may be an electrically operated heater and the device may comprise a power supply for powering the heater. The controller may be configured to control the supply of power to the heater and the controller may disable operation of the device by preventing the supply of power to the heater and may enable operation of the device by allowing the supply of power to the heater.

The aerosol-forming substrate is a substrate capable of releasing volatile compounds that can form an aerosol. The volatile compounds may be released by heating the aerosol-forming substrate. The aerosol-forming substrate may comprise plant-based material. The aerosol-forming substrate may comprise tobacco. The aerosol-forming substrate may comprise a tobacco-containing material containing volatile tobacco flavour compounds, which are released from the aerosol-forming substrate upon heating. The aerosol-forming substrate may alternatively comprise a non-tobacco-containing material. The aerosol-forming substrate may comprise homogenised plant-based material. The aerosol-forming substrate may comprise homogenised tobacco material. The aerosol-forming substrate may comprise at least one aerosol-former. An aerosol former is any suitable known compound or mixture of compounds that, in use, facilitates formation of a dense and stable aerosol and that is substantially resistant to thermal degradation at the operating temperature of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol and, most preferred, glycerine, such as glycerine or propylene glycol. The aerosol-forming substrate may comprise other additives and ingredients, such as flavourants. In one example, the aerosol-forming substrate comprises a mixture of glycerine, propylene glycol (PG), water and flavourings, and nicotine. In a preferred embodiment, the aerosol-forming substrate comprises approximately 40% by volume PG, 40% by volume glycerine, 18% by volume water and 2% by volume nicotine.

The device may include means for detecting the aerosol-forming substrate. For example, the aerosol-forming substrate may have a bar code or other indicia which the device can read. Alternatively, the aerosol-forming substrate may be provided with electrical contacts through which substrate identification information can be transmitted to the device. The controller may adjust operation of the device and may modify the user puff signatures dependent on the identity of the aerosol-forming substrate.

The system advantageously comprises a power supply, typically a battery, such as a rechargeable lithium ion battery, within a main body of the housing. As an alternative, the power supply may be another form of charge storage device such as a capacitor. The power supply may require recharging and may have a capacity that allows for the storage of enough energy for one or more smoking experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations of a heating element.

Preferably, the aerosol generating system comprises a housing. Preferably, the housing is elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

Preferably, the aerosol-generating system is portable. The aerosol-generating system may have a size comparable to a conventional cigar or cigarette. The smoking system may have a total length between approximately 30 mm and approximately 150 mm. The smoking system may have an external diameter between approximately 5 mm and approximately 30 mm.

The ability to detect particular puff signatures may be used not only for authentication purposes but also for recognising a user or particular user behaviour and adapting operation of the device to best suit that user or user behaviour.

In a third aspect of the invention, there is provided a method of controlling operation of an inhaling device, the inhaling device comprising a gas flow path through which gas can be drawn by the action of a user puff, a gas flow sensor within the gas flow path and a memory, the method comprising:

storing puff profile data in the memory;
recording gas flow measurements from the gas flow sensor;
comparing the gas flow measurements with the puff profile data to provide a plurality of correlation scores; and
modifying operation of the device based on a value of the correlation scores.

The puff profile data may be data recorded during previous operation of the device by the user. The method may further comprise recording user puff data based on signals from the gas flow sensor during operation of the inhaling device, and storing that data as the puff profile data in memory.

The inhaling device may be as described with reference to the second aspect and in particular may be an electrically operated smoking device. The step of modifying operation of the device may be, for example, modifying a power supplied to a heating element or other aerosol-generating component, modifying a control strategy, for example by modifying a target temperature or the duration of application of power to a heater or other aerosol-generating component, modifying the supply of one or more aerosol-forming substrates to an aerosol-generating element or into the gas flow path, or modifying the dimensions of a gas flow path.

If the initial puffing behaviour of a user matches particular stored user puff data, and that stored puff data is associated with particular control parameters for the device, those control parameters can be adopted for the duration of the operation of the device until the device is disabled or switched off.

In this way, operation of the device can be optimised for particular user behaviours. If it is determined that the user has started with a particular type of puffing behaviour, the device can control operation of the device for the duration of the operation of the device based on the assumption that the user will continue with the same puffing behaviour for the duration of that session of use.

In a fourth aspect of the invention, there is provided a computer program product which when executed on a programmable controller in an inhaling device, the inhaling device comprising a gas flow path through which gas can be drawn by the action of a user puff, a gas flow sensor within the gas flow path and a memory, performs the method of the first aspect of the invention.

In a fifth aspect of the invention, there is provided a computer program product which when executed on a programmable controller in an inhaling device, the inhaling device comprising a gas flow path through which gas can be drawn by the action of a user puff, a gas flow sensor within the gas flow path and a memory, performs the method of the third aspect of the invention.

FIG. 1 shows one example of an inhaling device and in accordance with the invention, which is electrically operated aerosol generating system. In FIG. 1, the system is a smoking system. The smoking system 100 of FIG. 1 comprises a housing 101 having a mouthpiece end 103 and a body end 105. In the body end, there is provided an electric power supply in the form of battery 107 and electric control circuitry 109. The electric control circuitry comprises a programmable microprocessor and a non-volatile memory and may include other electrical components as well. A puff detection system 111 in the form of a gas flow sensor is also provided in cooperation with the electric control circuitry 109. In the mouthpiece end, there is provided a liquid storage portion in the form of cartridge 113 containing liquid 115, a capillary wick 117 and a heater 119. Note that the heater is only shown schematically in FIG. 1. In the exemplary embodiment shown in FIG. 1, one end of capillary wick 117 extends into cartridge 113 and the other end of capillary wick 117 is surrounded by the heater 119. The heater is connected to the electric control circuitry via connections 121, which may pass along the outside of cartridge 113 (not shown in FIG. 1). The housing 101 also includes an air inlet 123, an air outlet 125 at the mouthpiece end, an aerosol-forming chamber 127, an LED indicator 129, a USB port 131 and a button 133.

In the embodiment shown in FIG. 1, the electric control circuitry 109 and puff detection system 111 are programmable. The electric control circuitry 109 and puff detection system 111 are used to manage operation of the aerosol generating system. This assists with control of the particle size in the aerosol.

FIG. 1 shows one example of an electrically operated aerosol generating system according to the present invention. Many other examples are possible, however. In addition, note that FIG. 1 is schematic in nature. In particular, the components shown are not to scale either individually or relative to one another. The aerosol generating system needs to include or receive an aerosol-forming substrate. The aerosol generating system requires some sort of aerosol generating element, such as a heater or vibrating transducer, for generating aerosol from the aerosol-forming substrate. But other aspects of the system could be changed. For example, the overall shape and size of the housing could be altered. Moreover, the system may not include a capillary wick.

However, in the embodiment illustrated in FIG. 1, the system does include a capillary wick for conveying liquid substrate from a storage portion to at least one heating element. The capillary wick can be made from a variety of porous or capillary materials and preferably has a known, pre-defined capillarity. Examples include ceramic- or graphite-based materials in the form of fibres or sintered powders. Wicks of different porosities can be used to accommodate different liquid physical properties such as density, viscosity, surface tension and vapour pressure. The wick must be suitable so that the required amount of liquid can be delivered to the heater. The heater may comprise at least one heating wire or filament extending around the capillary wick.

Alternatively, the heater may comprise a heating element that is arranged adjacent the wick or directly adjacent a liquid aerosol-forming substrate reservoir. In particular the heater may be a substantially flat. As used herein, "substantially flat" refers to a heater that is in the form of a substantially two dimensional topological manifold. Thus, the substantially flat heater extends in two dimensions along a surface substantially more than in a third dimension. In particular, the dimensions of the substantially heater in the two dimensions within the surface is at least 5 times larger than in the third dimension, normal to the surface. An example of a substantially flat heater is a structure between two substantially parallel surfaces, wherein the distance between these two surfaces is substantially smaller than the extension within the surfaces. In some embodiments, the substantially flat heater is planar. In other embodiments, the substantially flat heater is curved along one or more dimensions, for example forming a dome shape or bridge shape.

The heater may comprise a plurality of heater filaments. The term "filament" is used throughout the specification to refer to an electrical path arranged between two electrical contacts. A filament may arbitrarily branch off and diverge into several paths or filaments, respectively, or may converge from several electrical paths into one path. A filament may have a round, square, flat or any other form of cross-section. A filament may be arranged in a straight or curved manner.

The plurality of filaments may be an array of filaments, for example arranged parallel to each other. The filaments may form a mesh. The mesh may be woven or non-woven. The plurality of filaments may be positioned adjacent to or in contact with a capillary material holding the aerosol-forming substrate. The filaments may define interstices between the filaments and the interstices may have a width of between 10 μm and 100 μm. The filaments may give rise to capillary action in the interstices, so that in use, liquid to be vapourised is drawn into the interstices, increasing the contact area between the heater assembly and the liquid.

In one example, the heater comprises a mesh of filaments formed from 304L stainless steel. The filaments have a diameter of around 16 μm. The mesh is connected to electrical contacts that are separated from each other by a gap and are formed from a copper foil having a thickness of around 30 μm. The electrical contacts are provided on a polyimide substrate having a thickness of about 120 μm. The filaments forming the mesh define interstices between the filaments. The interstices in this example have a width of around 37 μm, although larger or smaller interstices may be used. Using a mesh of these approximate dimensions allows a meniscus of aerosol-forming substrate to be formed in the interstices, and for the mesh of the heater assembly to draw aerosol-forming substrate by capillary action. The heater is placed in contact with a capillary material holding a liquid aerosol-forming substrate. The capillary material is held within a rigid housing and the heater extends across an opening in the housing.

Referring again to the embodiment of FIG. 1, in use, operation is as follows. Liquid 115 is conveyed by capillary action from the cartridge 113 from the end of the wick 117 which extends into the cartridge to the other end of the wick which is surrounded by heater 119. When a user draws on the aerosol generating system at the air outlet 125, ambient air is drawn through air inlet 123. In the arrangement shown in FIG. 1, the puff detection system 111 senses the puff and activates the heater 119. The battery 107 supplies electrical energy to the heater 119 to heat the end of the wick 117 surrounded by the heater. The liquid in that end of the wick 117 is vaporized by the heater 119 to create a supersaturated vapour. At the same time, the liquid being vaporized is replaced by further liquid moving along the wick 117 by capillary action. (This is sometimes referred to as "pumping action".) The supersaturated vapour created is mixed with and carried in the air flow from the air inlet 123. In the aerosol-forming chamber 127, the vapour condenses to form an inhalable aerosol, which is carried towards the outlet 125 and into the mouth of the user.

Figure 2:
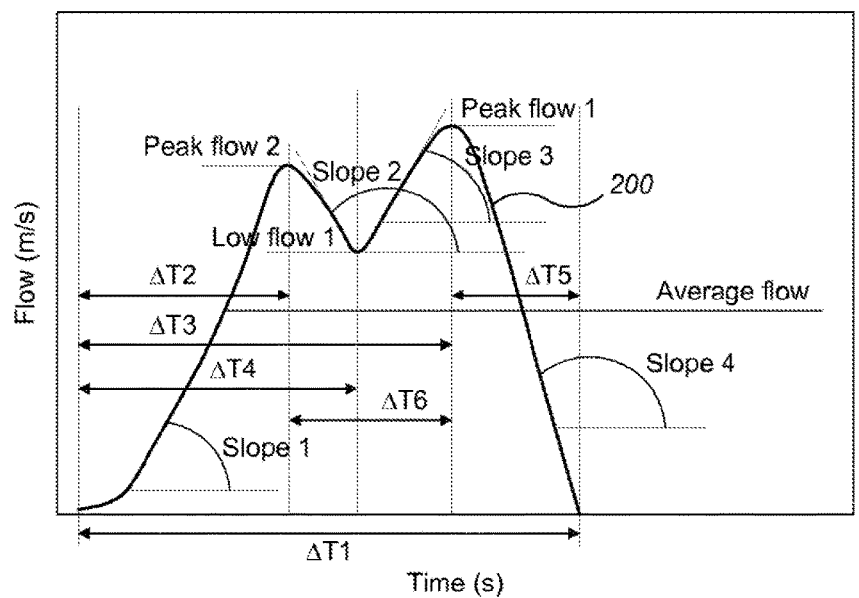
FIG. 2 illustrates a puff profile through a device of the type illustrated in FIG. 1.

FIG. 2 illustrates the temporal profile 200 of a user puff. The air flow rate past the puff detection system is indicated on the y-axis and the time is indicated on the x-axis. The puff profile 200 has a complex shape, with two local maximum flow rates and a local minimum flow rate. As can be seen from FIG. 2, the puff can be characterised by many different parameters. For example the total duration of the puff is indicated by $\Delta T1$, the time to the first local maximum is indicated by $\Delta T2$, the time to the second local maximum is indicated by $\Delta T3$, the time to the local minimum is $\Delta T4$, the time between the maximum flow rate and the end of the puff is $\Delta T5$ and the time between local maxima is $\Delta T6$. Also indicated on FIG. 2 is the average flow rate during the puff and the rates of change of flow rate during the puff. Slope 1 is the rate of change of flow rate until the first local maximum, Slope 2 is the rate of change of flow rate between the first local maximum and the subsequent local minimum, Slope 3 is the rate of change of flow rate between the local minimum and the second local maximum and Slope 4 is the rate of change of flow rate between the second local maximum and the end of the puff. Also shown in FIG. 2 is the Peak flow 2 which is the value of the first local maximum flow and Peak flow 1 which is the value of the second local maximum flow and is the overall maximum flow rate during the puff. All of these parameters and more, such as the curvature of the plot or the total air volume of the puff (the area under the curve) can be used as parameters that characterise the puff and can be used in the authentication of a user or in order to determine an operational mode for the system.

Figure 3:
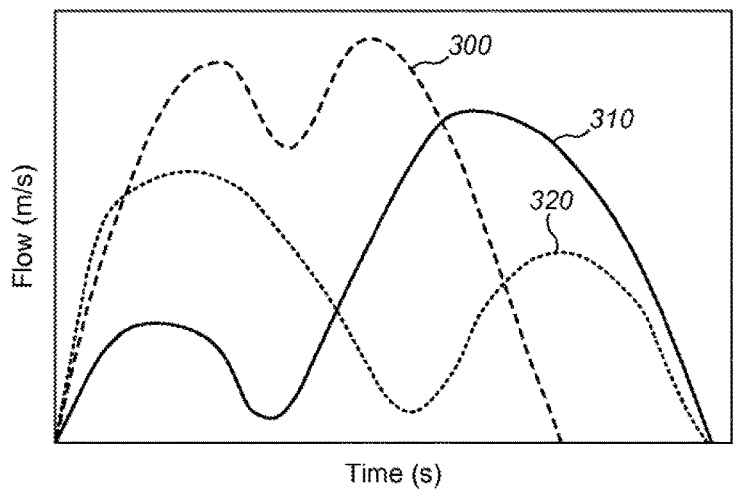
FIG. 3 illustrate possible puff profiles used as puff signatures.

In one embodiment, before use, the system is configured to carry out an authentication procedure so that only authorised users can operate the system. The authentication procedure is based on the user's puffing behaviour. In order to authenticate a user, the user must first record a user puff signature, which is a record of puffing behaviour over short but predetermined time period. FIG. 3 illustrates three exemplary puff signatures 300, 310, 320. The puff signatures may be recorded in the memory as flow rate measurements or alternatively may be stored as one or more parameters, of the type described above, extracted from the flow rate measurements. To be most distinctive a user may choose unusual and pronounced puffing behaviour as a signature, including several local flow rate peaks.

Figure 4:
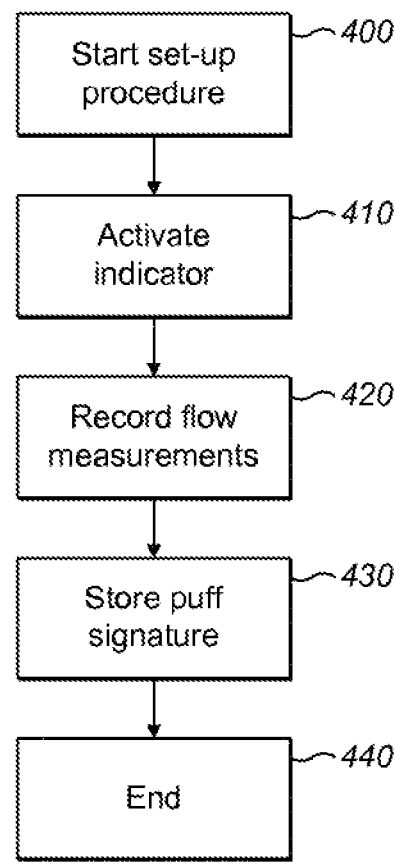
FIG. 4 is flow diagram of a set-up procedure for recording a user puff signature.

FIG. 4 is a flow diagram of a set-up procedure in which a user puff signature is recorded. In a first step 400 a set-up procedure is started. The set-up procedure may be started by holding down button 133 for at least 2 seconds. To avoid unauthorised users recording puff signatures, this may be possible only before the first use of the device or after a device reset has been carried out when the device is connected to a computer through the USB port 131. Once the set-up procedure has been started, in step 410 the controller 109 activates indicator 129 when it is ready to begin recording a puff signature. The user then puffs on the mouthpiece 125 and flow rate measurements are taken by the puff detector in step 420 for a predetermined period following the activation of the indicator 129. The flow rate measurements are stored in memory in step 430 as a puff signature. As explained, the puff signature can be stored as flow rate measurements or as one or more parameters extracted from the flow rate measurements using an algorithm executed by the microprocessor. The set-up procedure ends in step 440. The end of the set-up procedure can be indicated to the user by activating the LED 129 again.

As an alternative to the process of FIG. 4, a user puff signature may be recorded during first operation of the device, or the first few operations of the device, without requiring a set-up procedure. The natural puffing behaviour of a user may be unique enough to allow for authentication based on the first few moments of puffing. In that case, it may be particularly advantageous to continually update the user puff signature following each successful authentication. The greater the sample size on which the puff signature is based, the more reliable the authentication procedure is likely to be. Using the natural puffing behaviour of a user to generate a signature has the advantage of user convenience and minimises any delay between switching the device on and delivering aerosol to the user.

Figure 5:
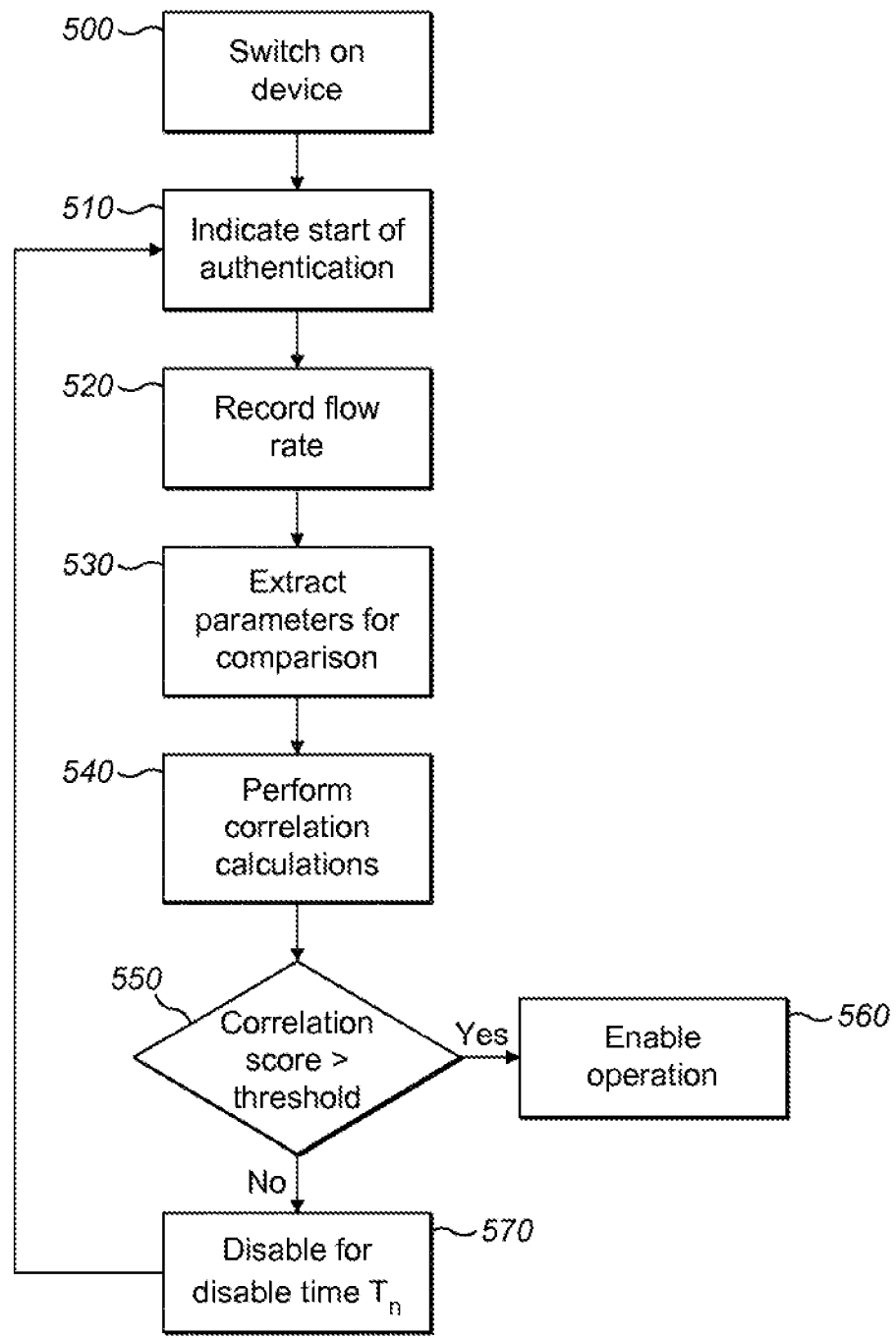
FIG. 5 is a flow chart of an authentication process in accordance with an embodiment of the invention.

FIG. 5 illustrates how the user puff signature can be used in an authentication process. In step 500 a user switches the device on. In step 510 the device then provides an indication to the user that the authentication procedure should begin, for example by activating indicator 129. The device then begins recording flow rate measurements in step 520. In step 530 the controller extracts from the recorded flow rate measurements the parameters to be used for comparison with the user puff signature(s). This step can include determining when the user starts the authentication process by puffing on the mouthpiece and taking flow rate measurement data for a following predetermined time period, matching the time period of the user puff signature. In step 540 the controller performs correlation calculations between the parameters extracted in step 530 with the stored user puff signature. The correlation algorithm used will depend on the number and complexity of the parameters being used. The correlation calculations result in a correlation score, which may be a single numerical value. For example, the correlation score may be derived from a weighted sum of correlation results based on each parameter being compared, and the coefficients for the weighted sum may depend on the values of the correlation results.

In step 550 the correlation score is compared to a threshold value stored in memory. If the correlation score exceeds the threshold the recorded flow rate measurements are considered to be a sufficiently good match to the stored user puff signature that the user can be authenticated as the author of the puff signature. In that case the process passes to step 560 in which further operation of the device is enabled by the controller storing an enable flag in the memory, and the user can enjoy a smoking session. If the correlation score does not exceed the threshold then the process passes to step 570, in which the operation of the device is disabled for a disable $T_n$ before another attempt at authentication can be made by returning to step 510. The device may provide an indication to the user while the device is disabled, for example by controlling the indicator 129 to flash.

The disable time may be determined by an authentication counter value n. Each time an unsuccessful attempt is made to match a user puff signature the counter value is incremented by one. When a successful authentication is made the counter value is reset to one. As the value of n increases the disable time is increased, until n reaches a maximum value of 5 for example. At the maximum counter value the device is permanently disabled until a reset operation is performed. A reset operation can be made to require an alternative form of authentication. For example, the device may be connected to a computer through the USB port and the user required to enter a password or some other form of user identification into the computer in order to reset the device.

The device may store several user puff signatures in memory corresponding to different authorised users or different user profiles from the same user. When several user puff signatures are stored in memory the correlation calculation of step 540 are carried out in relation to each stored puff signature to provide a plurality of correlation scores. The highest correlation score is then selected for comparison with the threshold in step 550.

The operational parameters of the device, such as the amount of power supplied to the heater during user puffs and the times at which power is switched on and off, can be adjusted for particular users. So, once a user has been authenticated in step 550, the controller may select an operational mode associated with that user. For example, during a registration process, while the device is connected to a computer, the user may be able to set user preferences or may complete a questionnaire about their smoking habits. This information may be used to set a user profile that is stored in the memory of the device and which determines the operational parameters used by the device for that user. A single user may store several different profiles and provide a different puff signature for each one. So a user may use one puff signature for their preferences for smoking in the morning and another puff signature for their preferences for smoking when on a night out.

Figure 6:
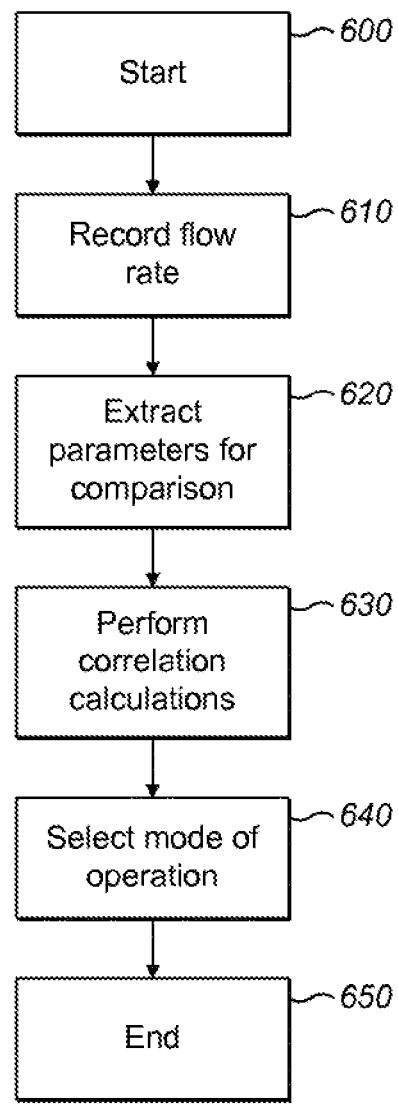
FIG. 6 is a flow chart of illustrating a process of selecting an operation mode based on use puff data.

FIG. 6 illustrates another, related aspect of the invention. In the process of FIG. 6, rather than using a stored user specific puff signature to determine an operation mode for the device, previously recorded user puffing data is used to predict the course of the smoking session. If the initial puffing behaviour of a user matches the initial puffing behaviour of a previous session, then the device operation is optimised on the assumption that the user puffing behaviour will continue to match that earlier smoking session.

In step 600 a smoking session is started. This may be after an authentication process of the type described with reference to FIG. 5 has been carried out. During the first user puff the gas flow rate past the gas flow sensor is recorded. In step 620 particular parameters for comparison with stored data are extracted from the gas flow rate measurements, in the same manner as described with step 530 of FIG. 5. In step 630 the extracted parameters are correlated to the parameters extracted from previous smoking sessions to provide a plurality of correlation scores. The correlation score corresponding to the best match is selected and in step 640 the mode of operation of the device selected based on the assumption that the user puff behaviour will match the previous puff behaviour associated with the matched parameters. The mode selection operation ends at step 650.

It is of course possible that the stored data in the process of FIG. 6 is not user specific but generic data stored in memory at the time of manufacture. The device could have several stored profiles, such as "intense puffing", "short puffing", "long puffing" etc. associated with particular initial puffing parameters. The profile having the best match to the initial puffing behaviour of the user is then selected.

Figure 7:
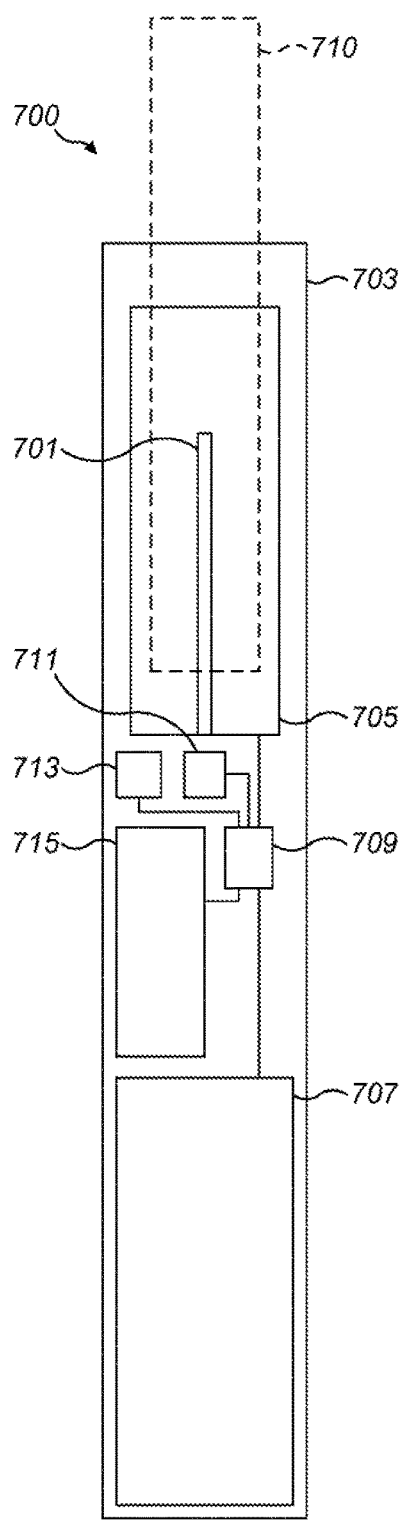
FIG. 7 illustrates a second example of an electrically operated smoking system in accordance with an embodiment of the invention.

FIG. 7 the components of an alternative embodiment of an electrically heated aerosol-generating device 700 are shown in a simplified manner. The embodiment of FIG. 7 is electrically heated tobacco device in which a tobacco based solid substrate is heated, but not combusted, to produce an aerosol for inhalation. The elements of the electrically heated aerosol-generating device 700 are not drawn to scale in FIG. 7. Elements that are not relevant for the understanding of this embodiment have been omitted to simplify FIG. 7.

The electrically heated aerosol-generating device 700 comprises a housing 703 and an aerosol-forming substrate 710, for example a cigarette. The aerosol-forming substrate 710 is pushed inside a cavity 705 formed by the housing 703 to come into thermal proximity with the heater 701. The aerosol-forming substrate 710 releases a range of volatile compounds at different temperatures. By controlling the operation temperature of the electrically heated aerosol-generating device 700 to be below the release temperature of some of the volatile compounds, the release or formation of these smoke constituents can be avoided.

Within the housing 703 there is an electrical energy supply 707, for example a rechargeable lithium ion battery. A controller 709 is connected to the heater 701, the electrical energy supply 707, and a user interface 715, for example a button and display. The controller 709 controls the power supplied to the heater 701 in order to regulate its temperature. An aerosol-forming substrate detector 713 may detect the presence and identity of an aerosol-forming substrate 710 in thermal proximity with the heater 701 and signals the presence of an aerosol-forming substrate 710 to the controller 709. The provision of a substrate detector is optional.

An airflow sensor 711 is provided within the housing and connected to the controller 709, to detect the airflow rate through the device.

The controller 709 controls the maximum operation temperature of the heater 701 by regulating the supply of power to the heater. The temperature of the heater can be detected by a dedicated temperature sensor. Alternatively, in the illustrated embodiment the temperature of the heater is determined by monitoring its electrical resistivity. The electrical resistivity of a length of wire is dependent on its temperature. Resistivity $\rho$ increases with increasing temperature. The actual resistivity $\rho$ characteristic will vary depending on the exact composition of the alloy and the geometrical configuration of the heater 701, and an empirically determined relationship can be used in the controller. Thus, knowledge of resistivity $\rho$ at any given time can be used to deduce the actual operation temperature of the heater 701.

In the described embodiment the heater 701 is an electrically resistive track or tracks deposited on a ceramic substrate. The ceramic substrate is in the form of a blade and is inserted into the aerosol-forming substrate 710 in use.

The recording of a puff signature and extraction of puff characteristics in the system of FIG. 7 operates in the same way as described with reference to FIGS. 1 to 6. However, with the addition of a substrate detector 713 it is possible to use information about the substrate to modify the correlation process to account for different resistances to draw (RTD) that different substrates provide. Substrates with higher RTD will give rise to lower gas flow rates through the system for a given user effort.

Although the invention has been described with reference to two different types of electrical smoking systems, it should be clear that it is applicable to other inhaling devices.

It should also be clear that the invention may be implemented as a computer program product for execution on programmable controllers within existing inhaling devices having a gas flow sensor. The computer program product may be provided as a downloadable piece of software or on a computer readable medium such as a compact disc.

The invention claimed is:

1. A method of controlling operation of an inhaling device, the inhaling device comprising a gas flow path through which gas can be drawn by action of a user puff, a gas flow sensor within the gas flow path, an aerosol-generating element, and a memory, the method comprising:
   recording a user puff signature based on a signal from the gas flow sensor during a set-up procedure, the recording comprising recording a gas flow rate past the gas flow sensor for a first predetermined time period:
   storing the user puff signature in the memory;
   recording gas flow measurements from the gas flow sensor;
   comparing the gas flow measurements with the user puff signature stored in the memory to provide a correlation score; and
   enabling or disabling further operation of the inhaling device based on a value of the correlation score by respectively enabling or disabling a supply of power to the aerosol-generating element.

2. The method according to claim 1, wherein the step of recording the user puff signature further comprises providing an indication to a user of a start of the first predetermined time period.

3. The method according to claim 1, wherein the step of recording gas flow measurements comprises recording a gas flow rate past the gas flow sensor for a second predetermined time period.

4. The method according to claim 3, wherein the step of recording the gas flow measurements further comprises providing an indication to user of a start of the second predetermined time period.

5. The method according to claim 1, wherein the step of enabling or disabling further operation of the inhaling device comprises comparing the correlation score with a threshold score and enabling further operation of the inhaling device if the correlation score exceeds the threshold score.

6. The method according to claim 1, further comprising a step of modifying the user puff signature based on the gas flow measurements if the correlation score exceeds a threshold score.

7. The method according to claim 1, wherein the step of comparing the gas flow measurements with the user puff signature comprises comparing one or more of the following parameters:
time to end of puff, time to peak flow rate, time to first maximum flow rate, time to first minimum flow rate, time between peak flow rates, rate of change of flow rate, number of peak flow rates, flow rate at peak flow rates, puff volume, peak flow ratios, rate of change of flow rate ratios, inter puff interval, and curve shape.

8. The method according to claim 1, further comprising modifying the recorded user puff signature dependent on a time of day prior to the step of comparing the gas flow measurements with the user puff signature.

9. The method according to claim 1, wherein the step of disabling the inhaling device comprises disabling the inhaling device for a predetermined disable time period.

10. The method according to claim 1, further comprising storing a plurality of user puff signatures, wherein the step of comparing the gas flow measurements with the user puff signature further comprises comparing the gas flow measurements with each puff signature of the plurality of user puff signatures to provide a plurality of correlation scores, and modifying the operation of the inhaling device operation dependent on which correlation score of the plurality of correlation scores is highest.

11. A nontransitory computer-readable storage medium having a computer program stored thereon, which when executed on a programmable controller in an inhaling device, the inhaling device comprising a gas flow path through which gas can be drawn by action of a user puff, a gas flow sensor within the gas flow path, an aerosol-generating element, and a memory, performs a method comprising:
recording a user puff signature based on a signal from the gas flow sensor during a set-up procedure, the recording comprising recording a gas flow rate past the gas flow sensor for a first predetermined time period;
storing the user puff signature in the memory;
recording gas flow measurements from the gas flow sensor;
comparing the gas flow measurements with the user puff signature stored in the memory to provide a correlation score; and
enabling or disabling further operation of the inhaling device based on a value of the correlation score by respectively enabling or disabling a supply of power to the aerosol-generating element.

12. An inhaling device, comprising:
a controller configured to control operation of the inhaling device;
a gas flow path through which gas can be drawn by action of a user puff;
a gas flow sensor disposed within the gas flow path;
an aerosol-generating element; and
a memory,
wherein the controller is further configured to;
record a user puff signature based on a signal from the gas flow sensor during a set-up procedure, the recording comprising recording a gas flow rate past the gas flow sensor for a first predetermined time period;
store the user puff signature in the memory;
compare the user puff signature stored in the memory with gas flow measurements from the gas flow sensor to generate a correlation score; and
enable or disable operation of the inhaling device based on a value of the correlation score by respectively enabling or disabling a supply of power to the aerosol-generating element.

13. The inhaling device according to claim 12, wherein the inhaling device comprises an electrically operated smoking system.

14. The inhaling device according to claim 12, wherein the aerosol-generating element comprises a heater.

15. The inhaling device according to claim 14, wherein the heater is configured, when enabled, to heat an aerosol-forming substrate comprising tobacco.

16. The method according to claim 1, wherein the inhaling device comprises an electrically operated smoking system.

17. The method according to claim 1, wherein the aerosol-generating element comprises a heater.

18. The method according to claim 17, wherein the heater, when enabled, heats an aerosol-forming substrate comprising tobacco.

19. The nontransitory computer-readable storage medium according to claim 11, wherein the inhaling device comprises an electrically operated smoking system.

20. The nontransitory computer-readable storage medium according to claim 11, wherein the aerosol-generating element comprises a heater configured, when enabled, to heat an aerosol-forming substrate comprising tobacco.

* * * * *